July 11, 1967  G. L. AHLSTEDT  3,330,401

APPARATUS FOR SELECTING AND DELIVERING LONG OBJECTS

Filed Jan. 25, 1966  3 Sheets-Sheet 1

United States Patent Office 3,330,401
Patented July 11, 1967

3,330,401
APPARATUS FOR SELECTING AND DELIVERING LONG OBJECTS
Gunnar Lennart Ahlstedt, Alfredshem, Sweden, assignor to Mo och Domsjö Aktiebolag, Ornskoldvik, Sweden, a limited company of Sweden
Filed Jan. 25, 1966, Ser. No. 522,950
Claims priority, application Sweden, Jan. 28, 1965, 1,135/65
18 Claims. (Cl. 198—26)

This invention relates to an apparatus for the selection and sidewise delivery of long objects, and more particularly, it relates to an apparatus for continuously selecting and delivering, at predetermined intervals, from a feeding station to a receiving station, a single long object or a specific group of long objects, such as logs.

The selection and delivery of individual objects, or selected groups of objects such as logs, pipes, and other objects which are generally of a long and cylindrical form, has, in the past, presented a substantial problem. Formerly, the selection and delivery of such objects in a direction perpendicular to their axes and direction of motion proved to be quite a difficult operation. For example, the delivery from a feeding station, such as a conveyor, a timber hopper, or the like, to a receiving station, such as a sorting apparatus, a conveyor belt, transport car, decomposing or cross-cutting apparatus, or the like, has in the past required rather expensive and complicated apparatus, which were designed for discontinuous operation. These devices could not without such discontinuous operation deliver one log from a group without at the same time delivering all the other logs in that group.

The instant invention provides an apparatus which is extremely simple and inexpensive to construct and operate. The instant apparatus selects and delivers one or more objects at a time in a continuous manner, laterally transporting them, such that the longitudinal axis is substantially perpendicular to the direction of motion, i.e., sidewise. The invention can also display the logs for visual, electronic or mechanical inspection to aid in sorting, as they are selected and delivered.

The instant invention provides an apparatus for the selection and sidewise delivery of long objects which includes at least two guide members; the first having first retaining means for retaining an object in a first position thereon, the second being movably mounted relative to the first, and having a second retaining means selectively spaced from the first retaining means for retaining the object in a second position. The second guide member, by movement relative to the first, is adapted to unseat the object from its position on the first guide member, and retain the object thereon, and thereafter the first guide member, by movement relative to the second, is adapted to unseat and thereby select and deliver the object from the second member.

The first guide member of the instant invention, in a preferred embodiment, is an inclined chute. This chute can be in the form of a plate, a slotted plate, a plurality of beams, or the like. On this first guide member or chute is a first retaining means, which is adapted to retain the object in a first position. This retaining means can be in the form of a pocket or depression in the chute, or can be a flanged portion of the chute, and should retain the object in a fixed position on the chute, until it is lifted away by a second guide member.

The second guide member is generally in the form of an arm movably mounted relative to the first guide member. However, the particular configuration of the second guide member is not in itself critical to this invention. The second guide member need only be shaped to engage and lift the object from the first retaining means, and retain it thereafter. The instant invention can include a plurality of second guide members, such as a linked series of arms interdigitated with the first guide member. The number of second guide members is determined by the objects being transported. If these objects are not of great length, then a single, relatively broad guide member can be sufficient. If, however, the objects are of a substantial length, and relatively heavy, then a plurality of second guide members may be required.

The second guide member, or arm, has a second retaining means. This second retaining means can take the form of an upturned end portion on the arm. However, such means can take any form which can retain the object in a second position on the arm, from which position it can be carried away by the first guide member.

The second retaining means is spaced at a point from the first retaining means which is selected to correspond to the predetermined diameter of the object to be selected, or to the span of a group of objects. This spacing can be fixed, or adjustable to any desired dimension. By appropriate adjustment of this spacing, the apparatus can, by relative movement of the first and second guide members, select and deliver an object or a number of objects whose span corresponds to the predetermined distance between the first and second retaining means. This operation will be described more fully below.

The objects may be moved along the guide members by any means, e.g., a conveyor movably mounted with each guide member. However, it has been found that the most desirable manner of moving relatively round objects along the guide members is by gravity, by setting the guide members at an inclined position, and thereby causing the objects to roll down them from the first to the second position.

At least one of the guide members, preferably the second guide member, is movably mounted relative to the first. In a preferred embodiment of this invention, this mounting is pivotal. However, the mounting between the first and second guide members can also be reciprocable, or any other form such that the movable guide member can be passed in one direction, generally upward, through the plane of the other member, and then returned through the same plane in a reverse direction. The movement can be effected by a hydraulic piston-and-cylinder, an electric motor, or by manual mechanical devices, such as a lever and cam. Any conventional means known to those skilled in the art can be used to move the movable guide member relative to the first.

In the preferred embodiment of this invention, the first guide member is fixed, and the second is movable. However, only relative motion is necessary therefore, the second guide member can be fixed, and the first movable, or both the first and second movable, relative to each other.

The guide members and retaining means of the instant invention can be made of any sturdy material, such as metal, e.g., steel, iron, and aluminum; wood, and plastic resinous materials such as phenol-formaldehyde, urea-formaldehyde, melamine-formaldehyde, polyvinyl chloride, polyethylene, polypropylene, polytetrafluoroethylene, nylon, polystyrene, polycarbonate and polyester resins. Any other material which is of sufficient strength to support and hold the objects to be selected and delivered can be used.

In operation, the objects to be selected are transported to the selecting and delivering device of the instant invention. This can be done by any conventional means, such as a conveyer, or the like. The object is deflected, or pushed from the conveyer, and traverses the first guide member untill it reaches the first retaining means. The first retaining means holds the object in the first position. The motion of the second guide member, relative to the first, is then initiated. Initiation of the movement can be accomplished either manually or by sensing apparatus, e.g., a photoelectric cell, which can detect the presence of an object in the first position, and actuates the means to move the second guide member. The second guide member will then be moved relative to the first, and will capture and unseat the object from its first position. It then retains the object and causes it to traverse the second guide member until it reaches the second retaining means, where it is again captured. Upon return movement of the second guide member, the first guide member will unseat those objects which are captured at the second retaining means. These objects are thereby selected, and when they are freed of the second retaining means can traverse the means and are delivered therefrom. The remaining objects on the first retaining means and between the conveyer and the first retaining means will be held by the first retaining means, and remain on the first guide member. Therefore, the distance between the first and second retaining means determines which objects will be selected and delivered. This distance is selected to correspond to the span of a desired object or number of objects. The cycle is repeated, and the next and following objects or groups of objects are similarly selected and delivered. Thus, the instant invention provides a means to select and deliver in a continuous operation, individual or selected groups of objects at regular intervals.

Figure 1:
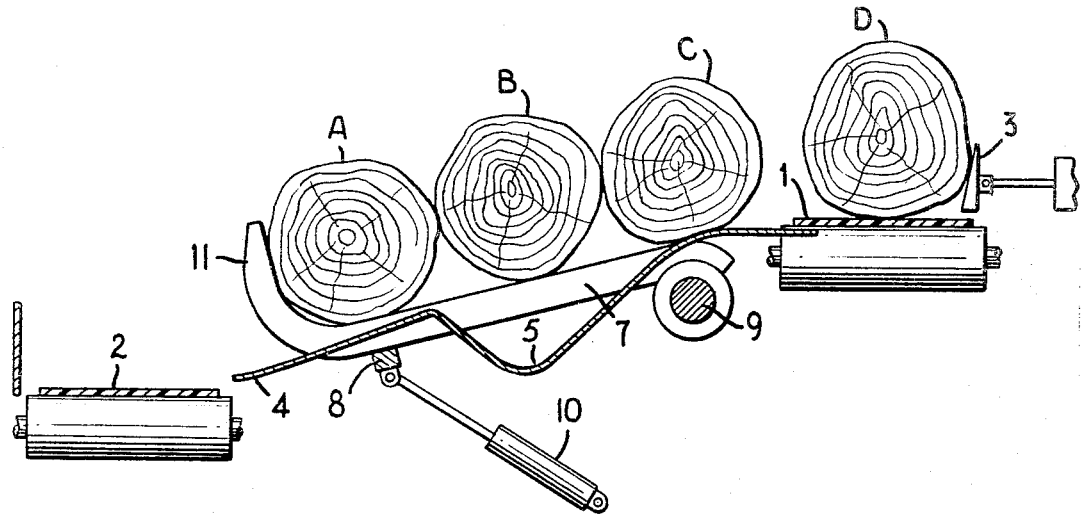
FIGURE 1 is a side view of one embodiment of the instant invention, in a first selection position, designed for the gravity selection and delivery of single logs from one conveyer to another.
Figure 2:
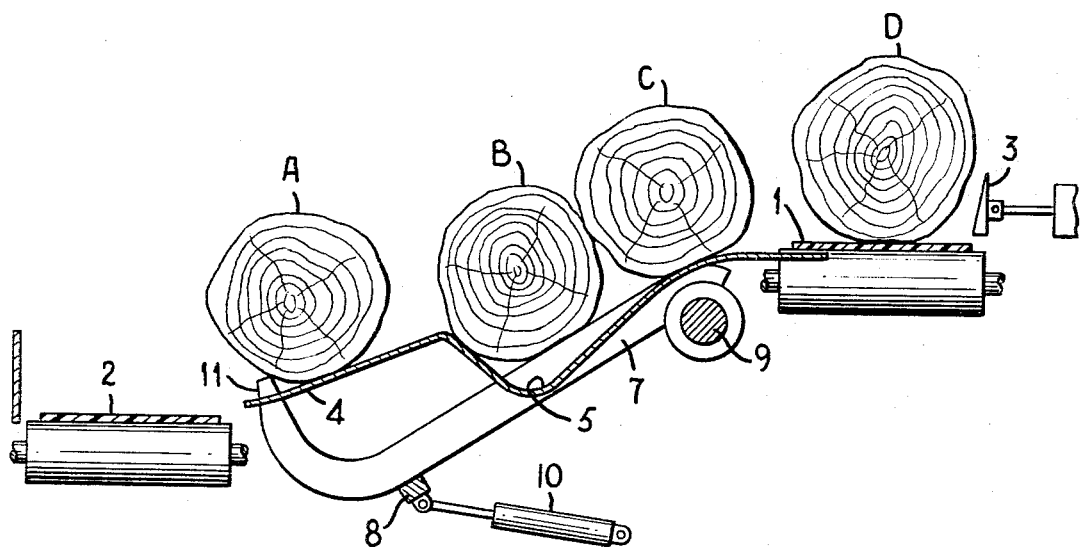
FIGURE 2 is a side view of the same embodiment of the instant invention, in the next successive position, showing a selected object about to be delivered, and the remaining object retained in the first retaining means for the next selection.
Figure 3:
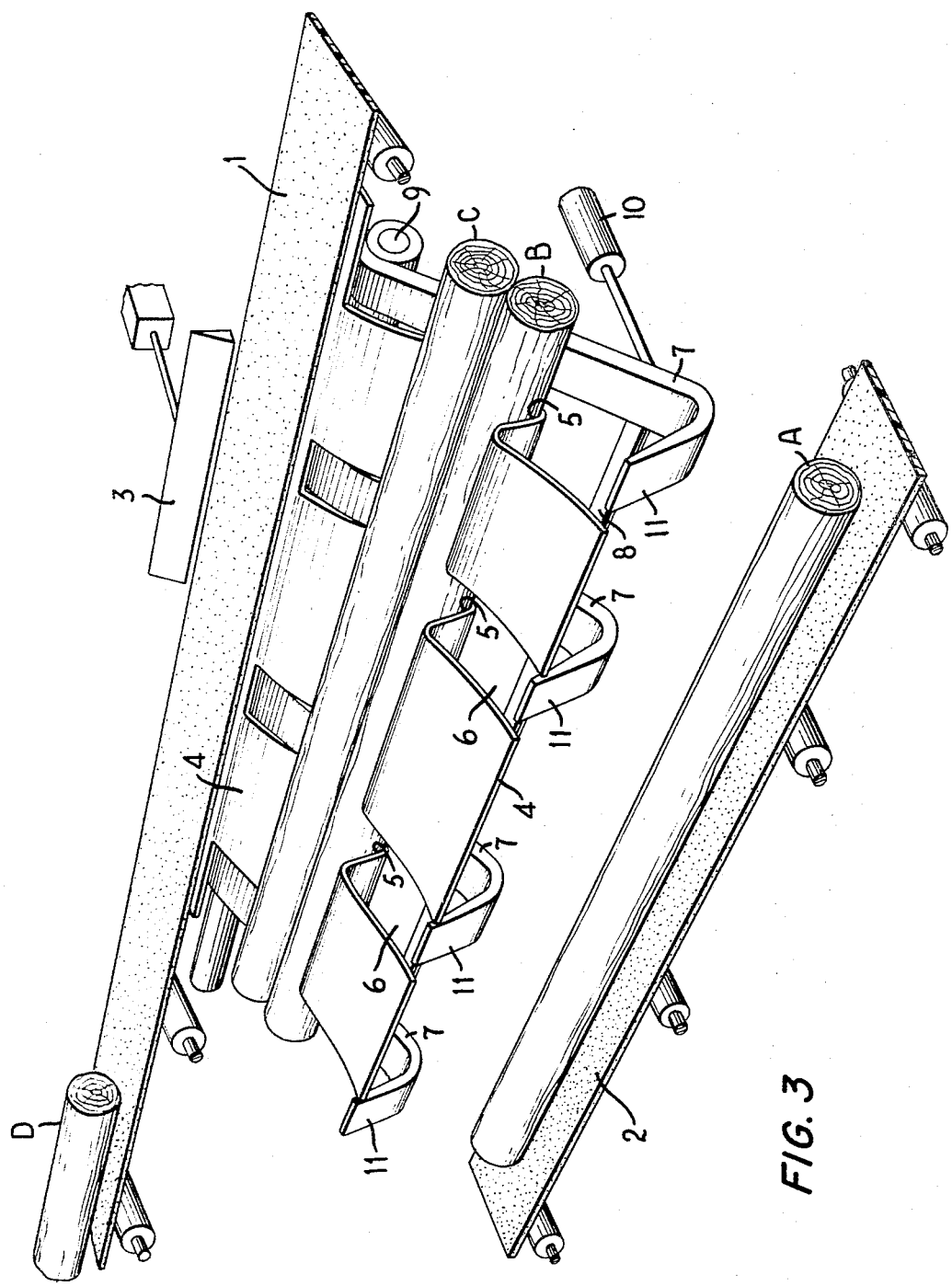
FIGURE 3 is a view in perspective of the same embodiment of the instant invention, showing the next successive position, with the selected object delivered to the second conveyor, and the remaining objects awaiting their turn.

The apparatus of FIGURES 1 to 3 includes a conveyor 1 for bringing the logs A, B, C and D to the instant apparatus for transfer to the second conveyor 2. A deflector 3, which can be initiated either manually or by a sensing instrument, as for example a mechanical or photoelectric object midpoint detecting device, pushes the logs so that they roll off the conveyor onto the fixed chute 4. This chute 4 constitutes the first guide member of the apparatus of the invention. In this embodiment of the invention, the chute 4 is in the form of an inclined plate having slots 6, and is situated directly adjacent to and below the conveyor 1. The slots 6 are disposed perpendicularly to the longitudinal axis of the logs A, B, C and D. The chute 4 is formed with a first retaining means in the form of a pocket or groove 5, which is disposed parallel to the longitudinal axis of the logs, and across the direction of motion of the logs. The logs roll down the chute, and are captured by the first retaining means 5.

In this embodiment of the invention, the second guide member is in the form of four arms 7, which are interdigitatingly positioned in the slots 6 of the chute 4. The ends of these arms 7 are laterally connected to each other by a support member or rod 8, to link the arms together for simultaneous movement. A pivot shaft 9, which is parallel to the axis of the logs, is placed at the other end of the chute 4, nearest the conveyor. The arms 7 are each pivotally mounted on this shaft. As pointed out above, the arms 7 and/or the chute 4 can be pivotable, but as shown in this embodiment, the chute 4 is fixed in position, and the arms 7 pivot relative thereto.

A hydraulic cylinder 10 is operatively connected to the second guide member for moving the guide member through the slots 6 of the chute 4. The arms 4 have upturned end portions 11 which constitute the second retaining means. At the delivery end of the apparatus is a second conveyor 2 which receives the logs.

In operation, when a log is in the pocket or groove 5, the arms 7 are swung upwardly through the slot 6 by the hydraulic cylinder 10. This movement is initiated either manually or upon a signal from a sensing instrument (not shown). As the arms 7 pass upwardly through the slots in the chute 4, the logs A, B and C, which are either retained in the pocket or groove 5 or resting on the chute 4, will be lifted onto the arms 7, as shown in FIGURE 1. These logs will be retained on the arms by the upturned end portions 11. The arms 7 are then by reverse movement of the hydraulic cylinder moved to return to their original position, whereby, when the arms 7 pass through the chute 4, log A, which is between the first and second retaining means, is selected and, when released from the end portion 11, and free to roll, delivered to the second conveyor 2. Those logs which are either above the groove or pocket 5 or between the groove or pocket 5 and the conveyor 1 will be retained on the chute 4. This can best be seen by reference to FIGURE 2.

In this embodiment of the invention, the distance along the chute 4 between the pocket or groove 5 and the upwardly turned end portion of the arms 7 is selected to correspond approximately to the diameter of one log, and is fixed, rather than adjustable. In FIGURE 3, log A has been freed of the end portions 11 by return movement of the arms 7 and is thereby delivered to the conveyor 2. The cycle can now be repeated for the continuous selection and delivery of logs.

Figure 4:
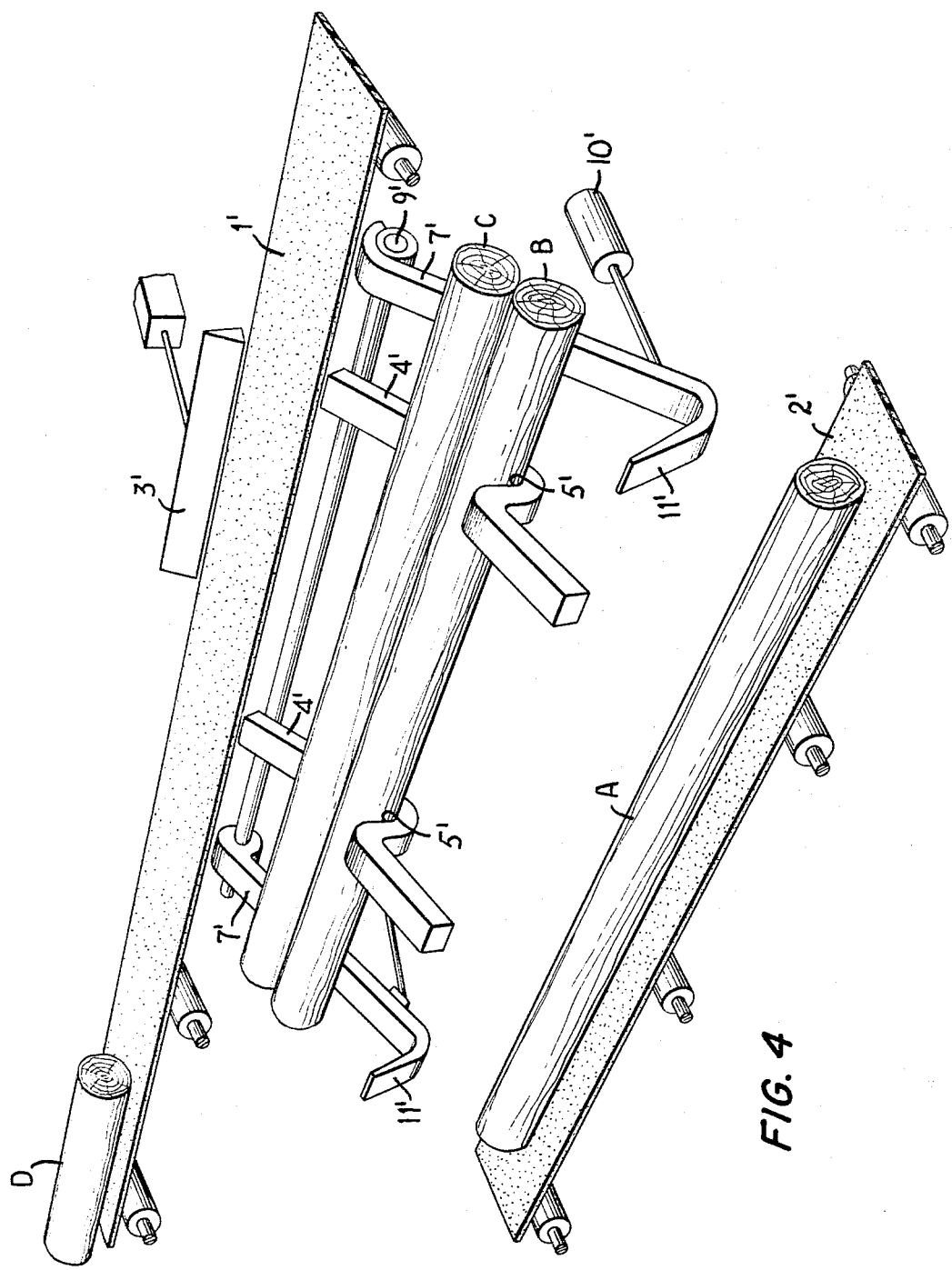
FIGURE 4 is a view in perspective of another embodiment of the invention, in the same position as FIGURE 3.

FIGURE 4 shows a second embodiment of the invention. In this embodiment, the guide members are interdigitated arms, of which the two beams 4' comprise the first guide members, and two arms 7' comprise the second guide members. The beams 4' are formed with retaining means in the form of a pocket or depressed portion 5'. These beams are rigidly attached to the pivot shaft 9', and are fixed relative to the conveyor 1'. The arms 7' are rotatably or pivotally mounted on the shaft 9' and have upturned end portions 11' for retaining the logs in a second position. In this embodiment, the arms 7' are moved by a hydraulic cylinder 11, as in the previous embodiment.

The operation of this embodiment is the same as that described in relation to FIGURES 1, 2 and 3. When the beams 4' are passed, during the return movement of the arms 7', the log which is on the arms between the pocket 5' and the upturned end portion 11' is selected and delivered.

In both the above embodiments of this invention, the relative speed of the arms and the timing of the cycle can be adjusted in relation to the speed of the conveyors and the time required for the logs to move along the guide members. The speeds are adjusted so that an overly large accumulation of logs does not occur on either conveyor or on the guide members. The differences in transport speed and the speeds of two different conveyor systems can be advantageously bridged by proper timing of the cycle. The upward and downward motion of the arms can be either entirely cyclic or initiated by the position of the object, and thereby independent of each movement of the arms. If the action of the arms is to be initiated by the object, sensing apparatus may be placed to cause or stop response of the arms whenever an object is in the depression 5, whenever many objects are present on the second conveyor to avoid overloading thereof, or whenever objects are near the end of the arms.

Thus, long objects can be selected and delivered in predetermined numbers and groups in a cyclic timed continuous operation.

Having regard to the foregoing disclosure, the following is claimed as the inventive and patentable embodiments thereof:

1. An apparatus for the selection and sidewise delivery of selected sets of long rollable objects of varying diameters from a closely spaced group of such objects, comprising, in combination, at least first and second guide members, the first having an object-receiving portion, an object-delivering portion and selecting and retaining means therebetween, positioned to select a predetermined set of objects from a group of objects on the second guide member, and retain the group of objects thereon, the second guide member being mounted for upward movement relative to the first guide member in a manner to transfer the retained group of objects from the first guide member onto the second guide member; the second guide member having a surface along which the objects can roll, with a stop means in proximity to a discharge end thereof, said stop means being spaced relative to the retaining means on the first guide member to locate a next set of objects to be selected on the second guide member in a delivery position for displacement and delivery therefrom by the delivering portion of the first guide member upon downward movement of the second guide member, so as to select such next set of objects for delivery and retain the remaining objects on the first guide member in position for future selection and delivery in sets.

2. An apparatus in accordance with claim 1, in which the long object is rolled along the guide members by gravity.

3. An apparatus in accordance with claim 1, in which the distance between the stop means and the selecting and retaining means is selected to correspond to approximately the diameter of one object, whereby the objects are selected and delivered one at a time.

4. An apparatus in accordance with claim 1, in which the second guide member is mounted for pivotal movement relative to the first guide member.

5. An apparatus in accordance with claim 1, in which the selecting and retaining means is a pocket portion on the first guide member.

6. An apparatus in accordance with claim 1, in which the stop means is an upturned end portion of the second guide member.

7. An apparatus in accordance with claim 1, in which the guide members are adapted for the selection and delivery of logs.

8. An apparatus in accordance with claim 1, in which the guide members are interdigitated arms.

9. An apparatus in accordance with claim 8, in which the guide members are a plurality of arms.

10. An apparatus in accordance with claim 1, in which the first guide member is in the form of a slotted plate.

11. An apparatus in accordance with claim 10, in which the second guide member comprises a plurality of pivotally mounted arms which move through the slots of the plate.

12. An apparatus in accordance with claim 1, including means to deliver the object to the guide members and means to transport the objects from the guide members.

13. An apparatus in accordance with claim 12, in which the means for delivering the object to the guide members and transporting the object away from the guide members are conveyors.

14. An apparatus in accordance with claim 13, including means to deflect the object from one conveyor onto the first guide member.

15. An apparatus in accordance with claim 1, in which the first guide member is an inclined chute, and in which the selecting and retaining means is a pocket portion in the chute, and the second guide member comprises at least one movable arm having an upturned end portion for retaining the object thereon, said arm by relative movement to the chute lifting the object from the pocket portion of the chute and allowing the object to roll along the arm until it reaches the upturned end whereby upon downward movement of the arm, the delivery portion of the chute unseats and delivers the object from its second position as the pocket portion simultaneously selects the object to be delivered.

16. An apparatus in accordance with claim 15, in which the chute comprises at least two spaced arms.

17. An apparatus in accordance with claim 15, in which the chute comprises a slotted plate.

18. An apparatus in accordance with claim 15, in which the pocket portion extends across the direction of motion to intercept the objects.

References Cited
UNITED STATES PATENTS

| | | | |
|---|---|---|---|
| 377,717 | 2/1888 | Kline. | |
| 1,031,058 | 7/1912 | Edwards | 198—26 |
| 1,911,106 | 5/1933 | Camerota. | |
| 2,751,781 | 6/1956 | McConnell | 198—26 X |

EVON C. BLUNK, *Primary Examiner.*

EDWARD A. SROKA, *Examiner.*